(12) United States Patent
Majima (10) Patent No.: US 8,213,341 B2
(45) Date of Patent: Jul. 3, 2012

(54) COMMUNICATION METHOD, TRANSMITTING METHOD AND APPARATUS, AND RECEIVING METHOD AND APPARATUS

(75) Inventor: Taichi Majima, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 710 days.

(21) Appl. No.: 10/594,456

(22) PCT Filed: Mar. 30, 2005

(86) PCT No.: PCT/JP2005/006725
§ 371 (c)(1),
(2), (4) Date: Sep. 26, 2006

(87) PCT Pub. No.: WO2005/096530
PCT Pub. Date: Oct. 13, 2005

(65) Prior Publication Data
US 2007/0206624 A1    Sep. 6, 2007

(30) Foreign Application Priority Data
Mar. 31, 2004 (JP) ................................. 2004-107311

(51) Int. Cl.
*H04L 12/16* (2006.01)
(52) U.S. Cl. ...................................................... 370/261
(58) Field of Classification Search .................. 370/477, 370/229, 235, 259–261, 351, 389, 392, 464–465; 379/202.01, 207.01
See application file for complete search history.

(56) References Cited

U.S. PATENT DOCUMENTS

| | | | |
|---|---|---|---|
| 6,427,135 B1 * | 7/2002 | Miseki et al. | 704/258 |
| 2005/0080870 A1 * | 4/2005 | Marks et al. | 709/217 |
| 2005/0250534 A1 * | 11/2005 | Maurer | 455/556.1 |

FOREIGN PATENT DOCUMENTS

| | | |
|---|---|---|
| JP | 64-005133 | 1/1989 |
| JP | 04-103231 | 4/1992 |
| JP | 08-182030 | 7/1996 |

(Continued)

OTHER PUBLICATIONS

International Search Report for PCT/JP2005/006725.

(Continued)

*Primary Examiner* — Derrick Ferris
*Assistant Examiner* — Omar Ghowrwal
(74) *Attorney, Agent, or Firm* — Eric J. Robinson; Robinson Intellectual Property Law Office, P.C.

(57) ABSTRACT

In a mobile telephone terminal at the transmitting end, voice data to be transmitted are sequentially inputted, and it is determined whether the inputted voice data are silent. The voice data regarded as silent voice are replaced by group numbers, while the voice data indicative of sonant voice as well as the group numbers as replaced are transmitted by wireless. On the other hand, in a mobile telephone terminal at the receiving end, the signals transmitted by wireless are received, and the voice data and group numbers of the received signals are discriminated. The voice data are reproduced as they are, while the group numbers are reproduced as silent, and further processings based on the group numbers are executed. This allows predetermined data to be repetitively transmitted with a high efficiency without degrading communication quality very much. This also facilitates a follow-up participation in a group call.

1 Claim, 7 Drawing Sheets

FOREIGN PATENT DOCUMENTS

| | | | |
|---|---|---|---|
| JP | 09-214460 | | 8/1997 |
| JP | 10-004578 | | 1/1998 |
| JP | 2001-168793 | | 6/2001 |
| JP | 2002-259560 | | 9/2002 |
| JP | 2003-298644 | | 10/2003 |
| WO | WO 99/27745 | * | 6/1999 |

OTHER PUBLICATIONS

International Preliminary Report for PCT/JP2005/006725 dated Mar. 1, 2007.

Supplementary European Search Report for PCT/JP2005/006725 dated Mar. 29, 2007.

Written Notification of Reason for Refusal (Application No. 2004-107311) dated Jan. 28, 2009.

Ruling of Dismissal for Amendments (Application No. 2004-107311) dated Jun. 18, 2009.

Examiner's Refusal Decision (Application No. 2004-107311) dated Jun. 18, 2009.

Written Notification of Reason for Refusal (Application No. 2004-107311) dated Nov. 4, 2008.

* cited by examiner

COMMUNICATION METHOD, TRANSMITTING METHOD AND APPARATUS, AND RECEIVING METHOD AND APPARATUS

TECHNICAL FIELD

The present invention relates to a communication method, a transmitting method and apparatus, and a receiving method and apparatus which can communicate actual data and predetermined data efficiently when replacing the predetermined data with the actual data, such as voice data, and transmitting it.

BACKGROUND ART

In a system which transmits voice in real time, there is technology which replaces voice data with data other than voice, and mutes (or repeats) the voice when the data other than voice is transmitted. For example, in STF-27 of ARIB currently explained in standard of digital automobile telephone systems issued by Association of Wireless Industries and Businesses (ARIB STANDARD) part I (RCRSTD-27 J version) (for example, FIGS. 4.15.2 to 4), which is a prior art document, such control that replaces voice data with FACCH (Fast Associated Control Channel) by providing a steal flag in a part of data which is framed, and setting the steal flag when there is data to be sent at high speed is performed.

In SCPC (Single Channel per Carrier) communication where half-duplex communication is a base such as a wireless, when it is desired to perform communication based on framed digital transmission, a function called "follow-up participation" may pose a problem. The follow-up participation means entering in a call in the middle of a call when one-many communication (group call) is performed in particular, and can hear the call performed to the many from the middle, for example, when a certain terminal moves to a strong electric field area from a weak electric field area. A group call is a function that data (address) of a group number and the like is sent at the time of a call start and only what have the address coinciding with the data can speak over the telephone, and even if carrier frequencies of respective terminals coincide, content of the call received is not reproduced when the group number and the like do not coincide.

Analog radios which were mainstream up to the conventional performed this processing using various methods. For example, a group was discriminated by separating 300 Hz or less of voice as a subvoice band from a usual voice band, and feeding a tone signal to this band, and the like. For this reason, it was easily attained that a certain terminal could perform the follow-up participation in a call.

On the other hand, a transmitter using digital SCPC (Single Channel Per Carrier) performs communication by transmitting a group number at high speed at the time of a call start, and then, arranging the group number in distinction from voice data in one frame, or dividing the group number to transmit it in several frames, and receiving the group number divided and transmitted over several frames, and linking them together and the like at a receiving end. For this reason, a follow-up participant can do the follow-up participation only in the timing of one frame or more.

There is a tendency that capacity (bit rate) of being transmittable digitally is in a cutback direction for one frame to become long due to efficiency increase of frequency utilization in these days. This is because a transmission efficiency deteriorates since a ratio of data (synchronous word etc.) which should be transmitted by one frame becomes large when one frame is made small.

In a system in which one frame is long and a low bit rate is damaged in this way, timing when the follow-up participation can be performed decreases, and hence, the follow-up participation becomes slow as a result.

A similar problem arises similarly not only when repeatedly transmitting a group number for follow-up participation, but also when repeatedly transmitting various control data stealing voice data, and hence, a method of transmitting efficiently both of the voice data and the control data which should be repeatedly transmitted is desired.

This invention is made in view of the above-mentioned actual circumstances, and sets it as a first object to enable efficient transmission of voice information and control information.

In addition, this invention sets it as a second object to make the follow-up participation easy.

Furthermore, this invention sets it as a third object to make it possible to transmit control information without dropping transmission efficiency of voice information.

In order to achieve the above-described invention object, a communication method which relates to a first aspect of the present invention includes a step of sequentially inputting voice data to be a transmission object, and discriminating whether the voice which is indicated by the inputted voice data is silent, a step of replacing the voice data which is discriminated that it indicates silent voice with predetermined data, and a step of performing wireless transmission of the predetermined data being replaced, with voice data indicating voice, at a transmitting end, and, a step of receiving the signal to be wireless transmitted, a step of discriminating the voice data and the predetermined data of the received signal, and a step of reproducing the voice data in the voice data, reproducing a silence in the predetermined data, and further executing processing based on the predetermined data, at a receiving end.

In the communication method of the present invention, preferably, the above-mentioned transmitting end further includes a step of forming a transmission frame from the above-mentioned voice data and the above-mentioned predetermined data being replaced, and a step of setting a steal flag which shows the presence of the predetermined data at the time of transmission, and the receiving end further includes a step of discriminating the presence of predetermined data on the basis of the steal flag in the received signal.

A communication method which relates to a second aspect of the present invention includes a step of sequentially inputting voice data to be a transmission object, a step of discriminating whether the voice which is indicated by the inputted voice data is silent, a step of replacing the voice data which is discriminated that it indicates silent voice with predetermined data, and a step of transmitting voice data indicating sonant voice, and the predetermined data being replaced, together.

A communication method which relates to a third aspect of the present invention includes a step of receiving a signal to be wireless transmitted, a step of discriminating voice data and the predetermined data which replaces voice data and is transmitted, in the received signal, a step of reproducing the voice data in the received voice data, and reproducing silence in the predetermined data replaced and transmitted, and a step of executing control processing based on the predetermined data replaced and transmitted.

A transmitting apparatus which relates to a fourth aspect of the present invention includes input means of inputting voice data, means of discriminating whether voice data inputted by the above-mentioned input means satisfies a predetermined non-transmission condition, replacement means of replacing voice data discriminated by the discrimination means that the voice data does not satisfy the non-transmission condition, with predetermined data by stealing, and transmission means of transmitting the voice data and the predetermined data being replaced.

In the transmitting apparatus of the present invention, it is preferable that the above-mentioned non-transmission condition is that voice data is silent voice data and a level of voice which the voice data indicates is a reference level or less, and that the above-mentioned replacement means operates so as to replace the silent voice data, or the voice data which is in the reference level or less, with the above-mentioned predetermined data.

Furthermore, more preferably, in the transmitting apparatus of the present invention, the above-mentioned replacement means includes means of composing a transmission frame including voice data discriminated by the above-mentioned discrimination means that the voice data does not satisfy the above-mentioned non-transmission condition, the above-mentioned predetermined data, and a control flag which shows the presence of the predetermined data, and the above-mentioned transmission means operates so that a signal may be transmitted by the above-mentioned frame unit.

A receiving apparatus which relates to a fifth aspect of the present invention includes receiving means of receiving a signal including an voice signal, detection means of detecting predetermined data replaced from an voice signal arranged in the signal received by the receiving means, reproduction means of reproducing the voice signal received by the receiving means, and further reproducing predetermined voice when predetermined data is detected by the detection means, and control means of executing processing based on the predetermined data detected by the above-mentioned detection means.

In the receiving apparatus of the present invention, it is preferable that the above-mentioned receiving means operates so as to receive a frame signal, that the above-mentioned detection means operates so as to detect predetermined data in an voice signal included in the above-mentioned frame signal, that the above-mentioned reproduction means operates, so as to reproduce the voice signal in the above-mentioned frame signal which is received by the above-mentioned receiving means, and further to reproduce the predetermined voice detected by the above-mentioned detection means, by the above-mentioned detection means, and that the above-mentioned control means of executing processing based on the predetermined data detected by the above-mentioned detection means.

In the receiving apparatus of the present invention, it is more preferable that a predetermined control flag which shows the presence of the above-mentioned predetermined data is set in the above-mentioned frame signal, and that the above-mentioned detection means operates so as to detect the above-mentioned predetermined data on the basis of the above-mentioned predetermined control flag.

Since the present invention adopts the above-mentioned configurations, it becomes possible to repeatedly transmit predetermined data (voice and control information data) efficiently without degrading communication quality so much.

BEST MODE FOR CARRYING OUT THE INVENTION

Hereafter, with reference to drawings, a wireless communications system which relates to embodiments of the present invention will be explained in detail.

Figure 1:
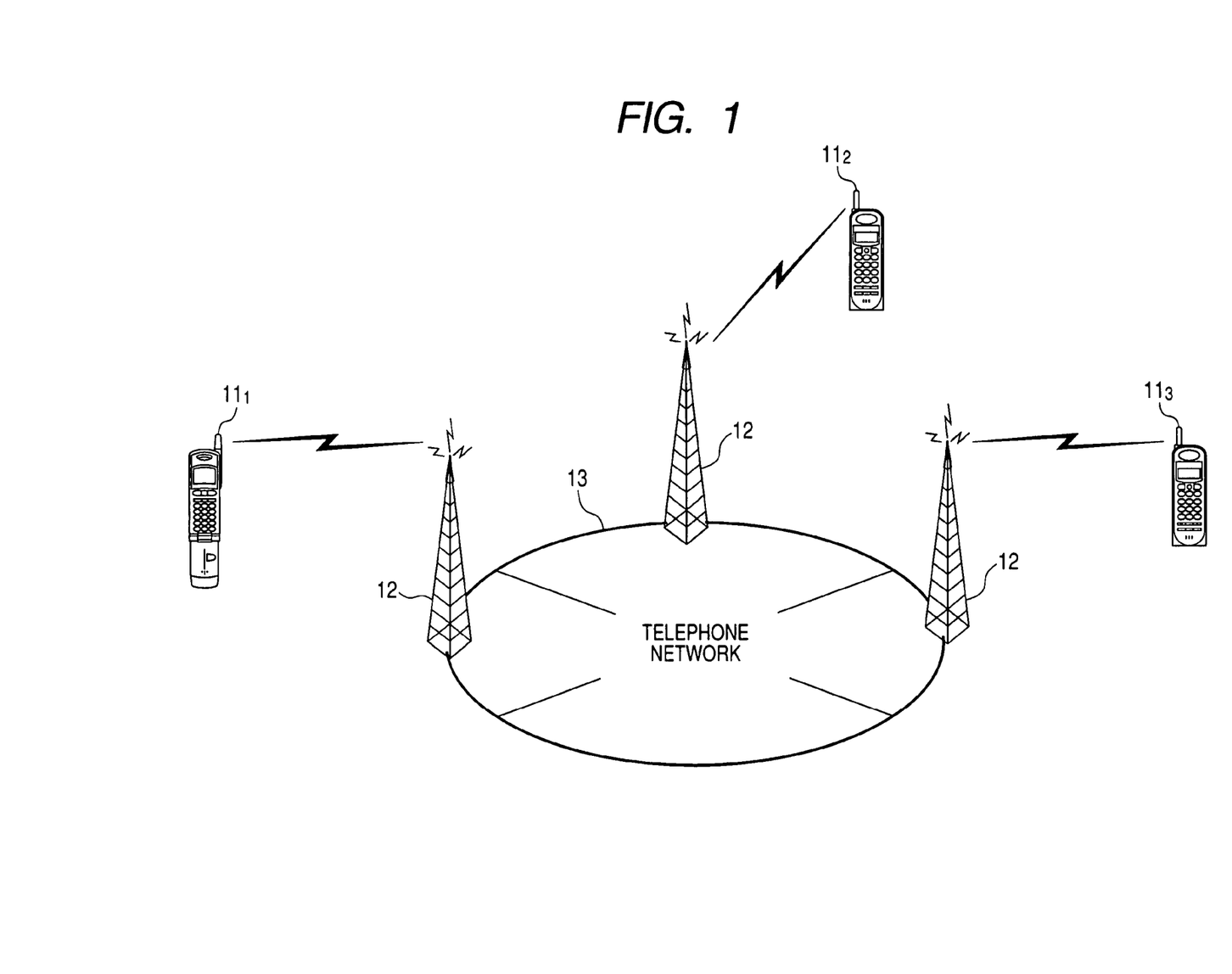
FIG. 1 is a diagram showing a configuration of a communication system in an embodiment of the present invention.

As shown in FIG. 1, the wireless communications system of this embodiment is configured with mobile telephone terminals 11 ($11_1$ to $11_3$) as a plurality of wireless communication terminals, and a network (e.g., a telephone network) 13 which is wireless-linked to the mobile telephone terminals 11 through a plurality of base stations 12.

Besides a usual phone number, each mobile telephone terminal 11 can be given a group number common to the plurality of mobile telephone terminals 11.

Each mobile telephone terminal 11 calls a mobile telephone terminal 11 for a call destination through the network 13 including a switching system by performing wireless communication with a base station 12, and originating a call specifying a phone number of the mobile telephone terminal 11 for the call destination.

In addition, when originating a call specifying a group number, one or a plurality of mobile telephone terminals 11 which is given this group number is called in.

Figure 2:
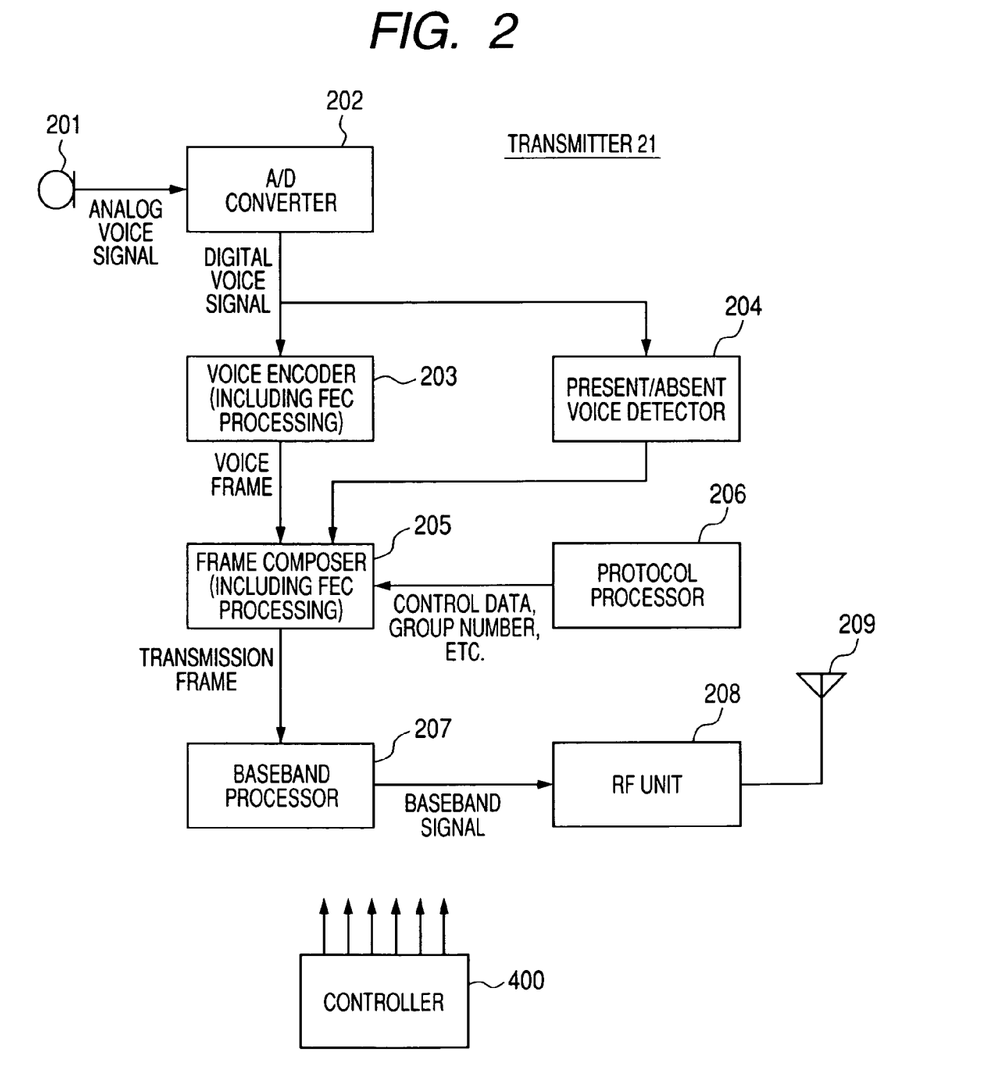
FIG. 2 is a block diagram showing a configuration of a transmitter of a mobile telephone terminal 11 shown in FIG. 1.
Figure 3:
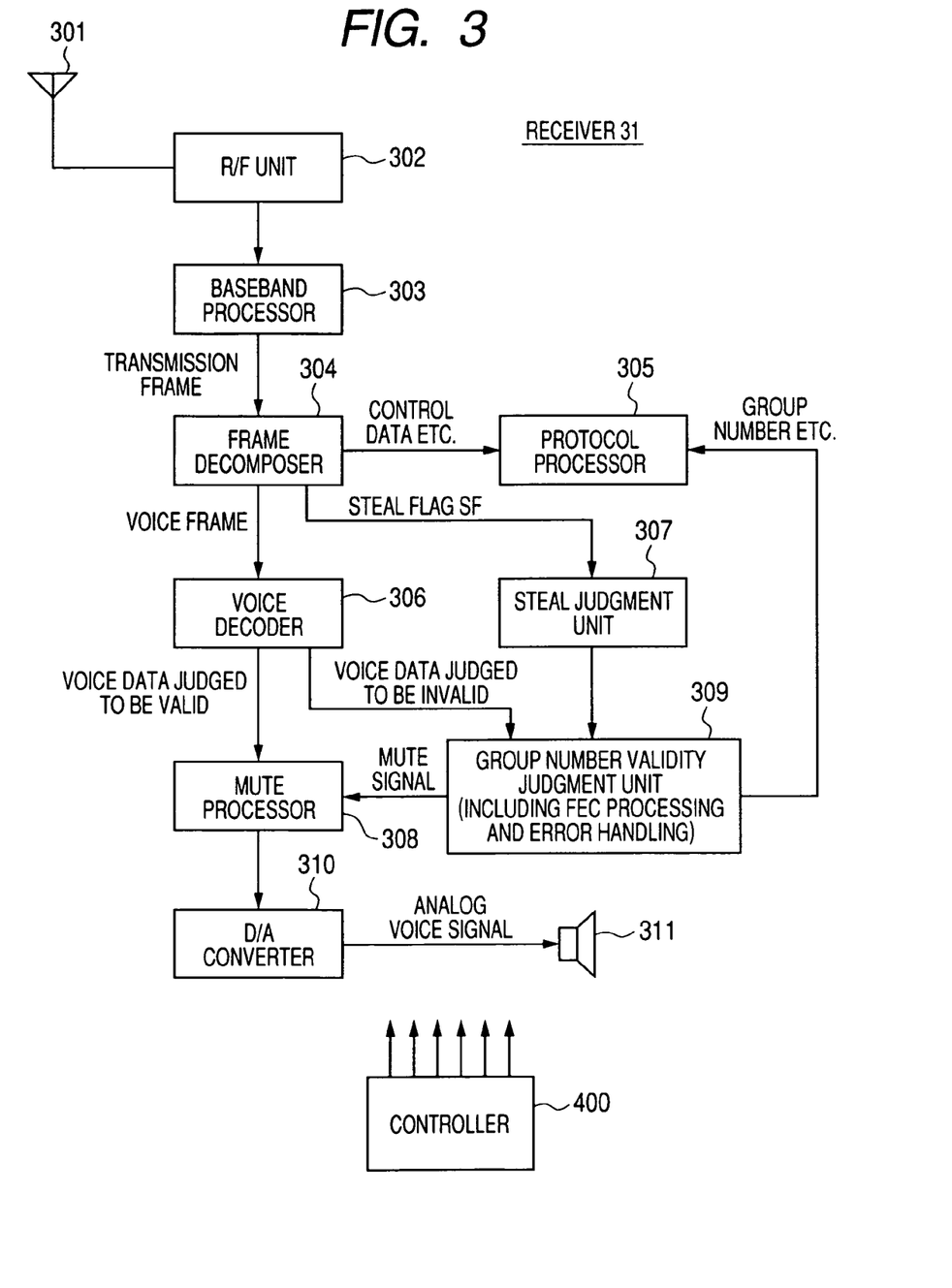
FIG. 3 is a block diagram showing a configuration of a receiver of the mobile telephone terminal 11 shown in FIG. 1.

Each mobile telephone terminal 11 includes a transmitter 21 shown in FIG. 2, and a receiver 31 shown in FIG. 3.

As shown in FIG. 2, the transmitter 21 includes a microphone 201, an A/D converter 202, an voice encoder 203, a sonant voice detector 204, a frame composer 205, a protocol processor 206, a baseband processor 207, an RF (high frequency: Radio Frequency) unit 208, an antenna 209, and a controller 400.

The microphone 201 is configured with a microphone device with an arbitrary configuration, and converts an voice signal into an analog electric signal to output it.

The A/D converter 202 samples an analog voice signal from the microphone 201 by a constant frequency (e.g., 200 kHz), and performs A/D (analog/digital) conversion to output a digital voice signal.

The voice encoder 203 is configured with an encoder of a vocoder, gives coding and compression processing to the digital voice signal from the A/D converter 202, and further applies an error correction code to output, for example, an 80-bit voice frame signal.

The sonant voice detector 204 discriminates whether voice (e.g., it is sonant voice and sound volume is a reference level or more) which the voice data inputted into the voice encoder 203 indicates is sonant or silent (e.g., silent voice and/or sound volume under the reference level), and outputs a signal which shows a discriminated result.

Figure 4A:
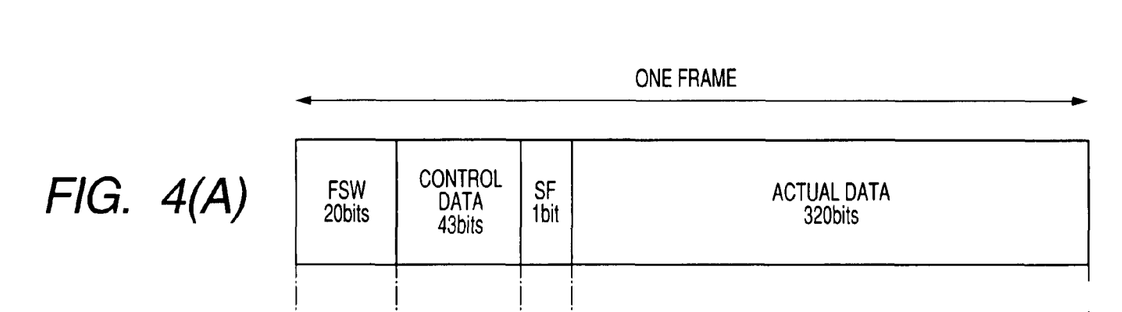
FIG. 4 includes drawings illustrating transmission formats.

The frame composer 205 forms a transmission frame with a format shown in FIG. 4(A).

As shown, a transmission frame is configured with a 20-bit synchronization code, 43-bit control data, a 1-bit steal flag, and 320-bit actual data.

Figure 4B:
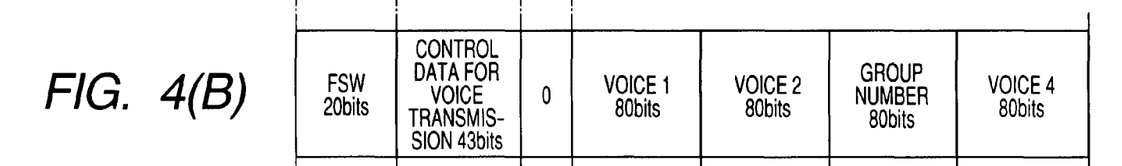

When performing specific explanation, in a usual voice transmission state, as shown in FIG. 4(B), the frame composer 205 composes a communication frame by setting control data for voice transmission as control data, and setting four (voices 1 to 4) 80-bit voice frames in an actual data unit. In addition, a steal flag SF is set at "0." Each voice frame is supplied from the voice encoder 203.

Figure 4C:
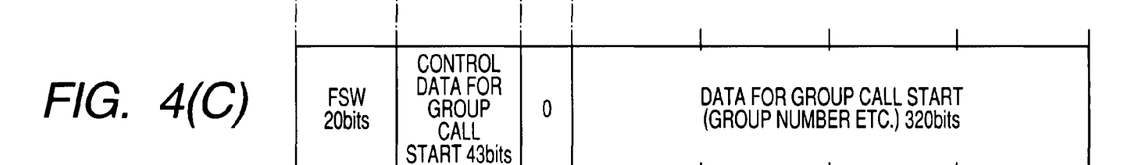

At the time of a group call start, as shown in FIG. 4(C), the frame composer 205 composes a communication frame by setting control data for group call execution as control data, and setting information, required for group call execution such as a group number, in the actual data unit.

The frame composer 205 further steals (replaces) the voice frame which is discriminated by the sonant voice detector 204 at the time of a group call that it is silent, for a group number of the group call in an embodiment to compose a transmission frame. Then, the steal flag is set to "1" when at least one of four voice frames is replaced by a group number.

Figure 4D:
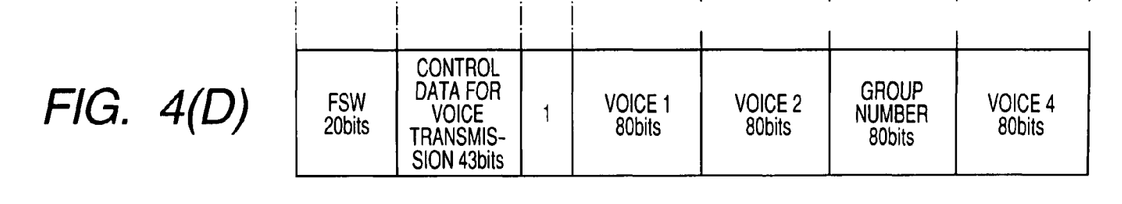

FIG. 4(D) is an example of formats when a third sound voice frame is silent, the steal flag is set to "1", and a third sound voice frame is replaced by a group number.

The protocol processor 206 processes a communication protocol and supplies control data to the frame composer 205.

The baseband processor 207 generates a baseband signal on the basis of a transmission frame supplied from the frame composer 205.

The RF unit 208 modulates, for example, a carrier wave with a baseband signal, and further, transmits this after frequency conversion and amplification through the antenna 209 and the like.

The controller 400 is configured with a central processing unit (CPU), its peripheral circuits, and the like, and is connected to a key operation unit and a display unit which are not shown to control operations of the above-described respective units and this whole transmission system according to an operation program.

On the other hand, as shown in FIG. 3, the receiver 31 includes an antenna 301, an RF unit 302, a baseband processor 303, a frame decomposer 304, a protocol processor 305, an voice decoder 306, a steal judgment unit 307, a mute processor 308, a group number validity judgment unit 309, a D/A converter 310, a speaker 311, and a controller 400.

The RF unit 302 decodes and outputs a baseband signal tuning with and decoding a wireless signal at a predetermined frequency which is received through the antenna 301.

The baseband processor 303 decodes the baseband signal, outputted from the RF unit 302, into a transmission frame and outputs it to the frame decomposer 304.

The frame decomposer 304 decomposes a frame signal, supplies control data to the protocol processor 305, supplies the steal flag SF to the steal judgment unit 307, and outputs four voice frames (voice 1 to voice 4) to the voice decoder 306 one by one. The frame decomposer 304 reports actual data to the protocol processor 305 depending on a content of control data.

The voice decoder 306 performs FEC (Forward Error Correction) processing, error correction processing, and the like of each voice frame supplied from the frame decomposer 304 to reproduce voice data.

The steal judgment unit 307 discriminates whether a steal flag in each frame data which is decoded is ON or OFF, and when ON, it outputs an ON signal to the voice decoder and group number validity judgment unit 309.

The group number validity judgment unit 309 extracts data, stolen to an voice signal, from among four voice frames included in a transmission frame to which the steal judgment unit 307 outputted an ON signal, performs FET, error handling, and the like to the extracted data to decode data, discriminates whether the decoded data is valid as a group number, when valid transmits the group number judged to be valid, to the protocol processor 305, and sends out a mute signal to the mute processor 308.

The mute processor 308 outputs voice data from the voice decoder 306 as it is while a mute signal is not supplied from the group number validity judgment unit 309, and mutes and outputs voice data while the mute signal is outputted.

The D/A converter 310 converts voice data supplied through the mute processor 309, into an analog voice signal, and emits a sound through the speaker 311.

The protocol processor 305 receives control data from the frame decomposer, and a group number from the group number validity judgment unit 309, and controls a receiving operation on the basis of the control data and group number which are received. For example, the protocol processor 305 commands the controller 400 so as to enter into a group call receiving mode when the control data indicates a group call start and the group number coincides with any one of group numbers currently assigned to itself. In addition, the protocol processor 305 commands the controller 400 so as to perform the follow-up participation to a group call and to enter into a group call receiving mode when the group number supplied from the group number validity judgment unit 309 coincides with any one of group numbers currently assigned to itself.

The controller 400 is configured with a processor and the like, responds an input designation from an input unit, for example, to supply a control signal to each unit and to make it operate, and, supplies various control information to the protocol processor 305 to make it perform a receiving operation and a transmitting operation.

Next, a group call operation of a mobile telephone terminal system with the above-mentioned configuration will be explained.

1) Operation of Group Call Start

The transmitting and receiving operations at the time of a group call start are basically the same as that of the conventional technique.

That is, a user who performs a group call specifies a command that a group call should be executed, and a group number given to a group of mobile telephone terminals which are transmission objects, from an input unit or the like. In response to this command, the controller 400 outputs a command of commanding a group call, a group number (group address), and a call-out to the protocol processor 206.

The protocol processor 206 responds this command and supplies control data of indicating transmission of a group number, and the number of the group which is an object of the call-out, to the frame composer 205.

The frame composer 205 composes transmission frame data by combining a synchronization code, the control data of indicating transmission of a group number, a steal flag "0", and a group number as shown in FIG. 4(C) on the basis of the provided information, and supplies it to the baseband processor 207.

The baseband processor 207 generates and outputs a baseband signal from a transmission frame supplied from the frame composer 205.

The RF unit 208 not only modulates a carrier with a baseband signal, but also transmits this through the antenna 209 and the like after frequency conversion and amplification.

On the other hand, the receiver 31 of the mobile telephone terminal 11 which becomes on standby receives a carrier signal through the antenna 301, and decodes a transmission frame by the RF processor 302 and baseband processor 303.

The frame decomposer 304 supplies the control data obtained by decomposition, to the protocol processor 305 as it is, and supplies actual data to the protocol processor 305 since the control data indicates the group call start.

The protocol processor 305 discriminates whether the group number included in the supplied actual data coincides with any one of the group numbers currently assigned to itself, and supplies a signal designating reception of the group call, to the controller 400 when coinciding. Hereafter, it enters into a group call receiving state by control processing of the controller 400.

2) Operation after Group Call Start

At the mobile telephone terminal 11 at a transmitting end, the A/D converter 202 samples the analog voice signal supplied from the microphone 201 periodically every 20 ms, and sequentially converts it into a digital voice signal (one voice frame) with a predetermined bit count to output it.

The voice encoder 203 processes addition of an error correcting code, and the like while encoding the digital voice signal currently sent one by one in a cycle of 20 ms, and it sequentially outputs 80-bit voice data equivalent to one voice frame.

In parallel to the encoding of each voice frame by the voice encoder 203, the sonant voice detector 204 discriminates whether voice which each voice data supplied from the A/D converter 202 indicates is sonant or silent, and outputs a discrimination signal which shows a discriminated result.

The frame composer 205 composes a transmission frame whose basic configuration is shown in FIG. 4(A) on the basis of the voice data from the voice encoder 203, the data from the protocol processor 206, and the signal which shows distinction of sonant and silent from the sonant voice detector 204.

That is, the frame composer 205 incorporates voice data into a transmission frame in the voice data that a signal, which shows that it is sonant, is supplied from the sonant voice detector 204. On the other hand, the frame composer 205 incorporates data, which shows a group number, is given FEC, and is supplied from the protocol processor 206, into a transmission frame, stealing the voice data about the voice data that a signal, which shows that it is silent, is supplied from the sonant voice detector 204. In addition, the steal flag is set to "1" when at least one of four voice data is replaced by a group number. Furthermore, what is for a group call and is supplied from the protocol processor 206 is set as control data.

Hence, for example, that is, when all of the four voice frames shows sonant, as shown in FIG. 4(D), one frame is composed by combining FSW (synchronization code), control data from the protocol processor 206, a steal flag "0", and voice data provided in order from the voice encoder 203.

On the other hand, when one of voice frames is silent, as shown in FIG. 4(C) (FIG. 4(C) is an example when a third sound voice frame is silent), one frame is composed by combining FSW (synchronization code), control data from the protocol processor 206, a steal flag "1", and voice frames discriminated that they are sonant among the voice data supplied from the voice encoder 203 and a group number which is supplied from the protocol processor 206 and replaced with the voice frame which is discriminated that it is silent.

The frame composer 205 supplies the composed transmission frame to the baseband processor 207. The baseband processor 207 generates a baseband signal from the transmission frame.

The RF unit 208 modulates a carrier with a baseband signal supplied from the baseband processor 207, and further performs frequency conversion and amplification to perform wireless transmission.

Next, in the receiver 31 of the mobile telephone terminal 11 at a receiving end, a signal received through the antenna 301 is decoded into a transmission frame by the RF unit 302 and baseband processor 303, and is supplied to the frame decomposer 304.

The frame decomposer 304 decomposes one transmission frame of data according to a format shown in FIG. 4(A), supplies the control data to the protocol processor 305, supplies the steal flag SF to the steal judgment unit 307, and supplies the voice data to the voice decoder and group number validity judgment unit 309 one by one.

The steal judgment unit 307 judges whether the supplied steal flag SF is ON (at least one of four voice frames in a transmission frame is stolen), or OFF (four voice frames in a transmission frame are not stolen by all the voice data being sonant), and outputs a signal which shows a judged result, to the group number validity judgment unit 309.

The voice decoder 306 decodes the supplied voice data per one voice frame. At this time, it performs FEC and error detection processing and further judges whether it is valid as voice data. The voice decoder 306 outputs the decoded voice data which is discriminated that it is valid as voice data, to the mute processor 308. The voice decoder 306 supplies the voice data which is discriminated that it is not valid as voice data, to the group number validity judgment unit 309.

When receiving data which is discriminated that it is not valid as voice data, from the voice decoder 306 in the case of receiving from the steal judgment unit 307 a signal that the steal flag SF is ON, the group number validity judgment unit 309 performs the FEC processing, error handling, and the like about the received data, and discriminates whether it is valid as a group number.

When judging that it is valid as a group number, the group number validity judgment unit 309 supplies the group number to the protocol processor 305, and outputs a mute signal to the mute processor 308.

The mute processor 308 outputs the decoded voice data recognized to be valid as voice data by the voice decoder 306, as it is, and performs muting according to the mute signal (voice data which will become in a silent state is outputted) about data recognized to be valid as group data.

In addition, it is also sufficient to perform muting without exception about data in which the steal flag SF is ON, and which is recognized not to be valid as voice data, regardless of whether it is judged that it is valid as a group number. Furthermore, it is also sufficient to perform muting about all the data to be recognized not to be valid as voice data.

The D/A converter 310 converts data supplied through the mute processor 308, into an analog signal and outputs it.

When the control data provided from the frame decomposer 304 shows voice transmission, and further, the group number supplied from the group number validity judgment unit 309 coincides with a group number of any group to which itself belongs, the protocol processor 305 commands the controller 400 so as to enable reception of a group call. Nevertheless, about a mobile telephone terminal 11 which has entered from the time of the group call start, there is no particular processing to be performed. On the other hand, a mobile telephone terminal 11 which was in a weak electric field state at the time of the group call start can also enter into a group call in this phase.

When it is determined to enter into a group call from the beginning or by the follow-up participation, the controller 400 makes a emitted sound from the speaker 311 possible, for example, by turning on an amplifier which is not shown. Thereby, in one call, unless the group number coincides, voice is never outputted from the speaker 311.

As explained above, according to this embodiment, silent voice frame is stolen and a group number is transmitted at the transmitting end, and the follow-up participation on the basis of control data is enabled at the receiving end. Usually, voice includes many silent portions, and in particular, as indicated in the above-mentioned example, it is judged in many cases that it is silent for 20 ms of interval. Hence, it is possible to transmit a group number comparatively frequently and it is possible to perform the follow-up participation quickly. In addition, since silent voice is stolen and it is performed to "reproduce a silence" at the receiving end, there are also little degradation of quality of voice to be transmitted.

In addition, this invention is not limited to the above-mentioned embodiments, but various modifications and applications are possible for it.

Furthermore, in FIGS. 2 and 3, although a system configuration is shown in discrete block configuration, it is also possible to configure all or a part of it using a processor such as a CPU or a DSP (Digital Signal Processor).

Figure 5:
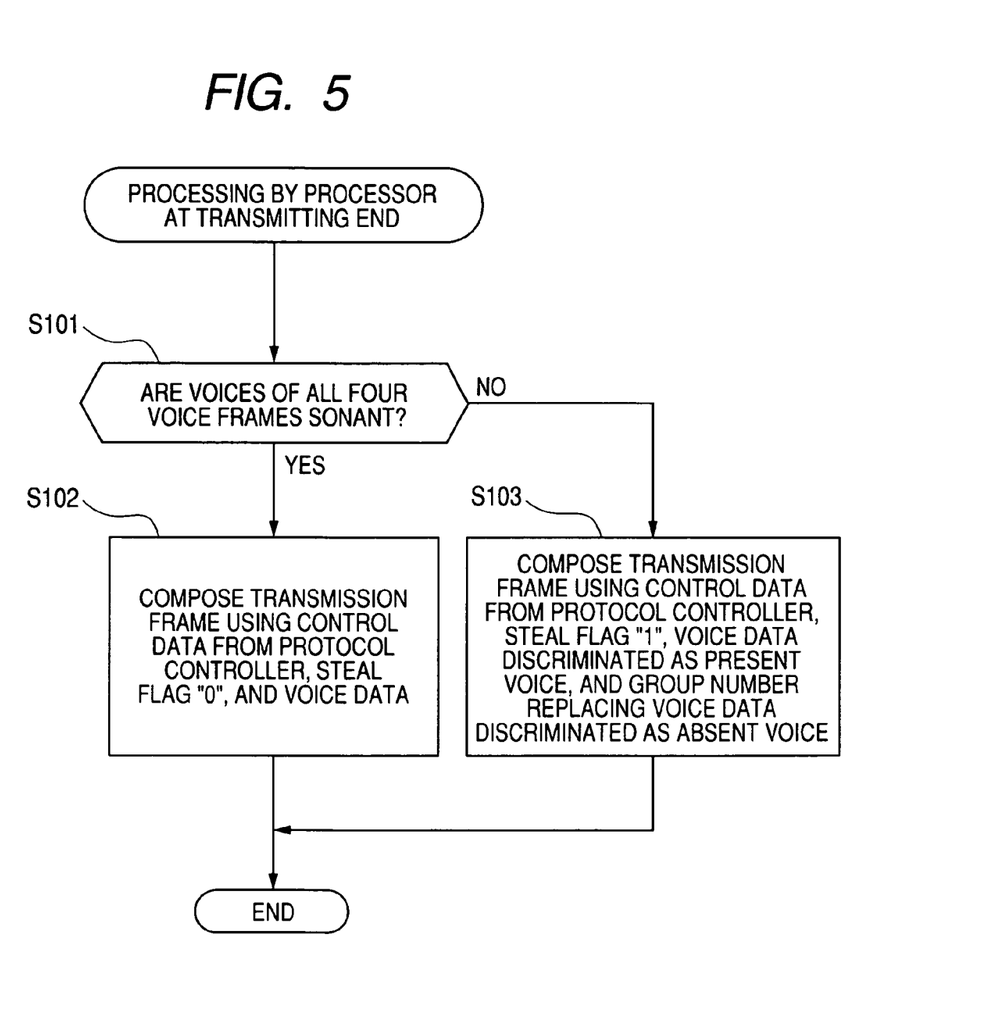
FIG. 5 is a flowchart illustrating software processing at a transmitting end in the case of using a processor in a processing circuit.

In this case, a processor of the mobile telephone terminal 11 at the transmitting end discriminates whether all the voice which voice data of four voice frames sequentially supplied from the A/D converter 202 indicates are sonant, for example, as shown in a flowchart of FIG. 5 (step S101). When all are sonant, as shown in FIG. 4(B), the steal flag SF is set at "0", and a transmission frame is formed using the four voice frames (step S102). On the other hand, when there is at least one voice frame without voice (silent), the steal flag SF is set at "1", and a transmission frame is formed as shown in FIG. 4(D) using a group number instead of the silent voice frame (step S103).

Figure 6:
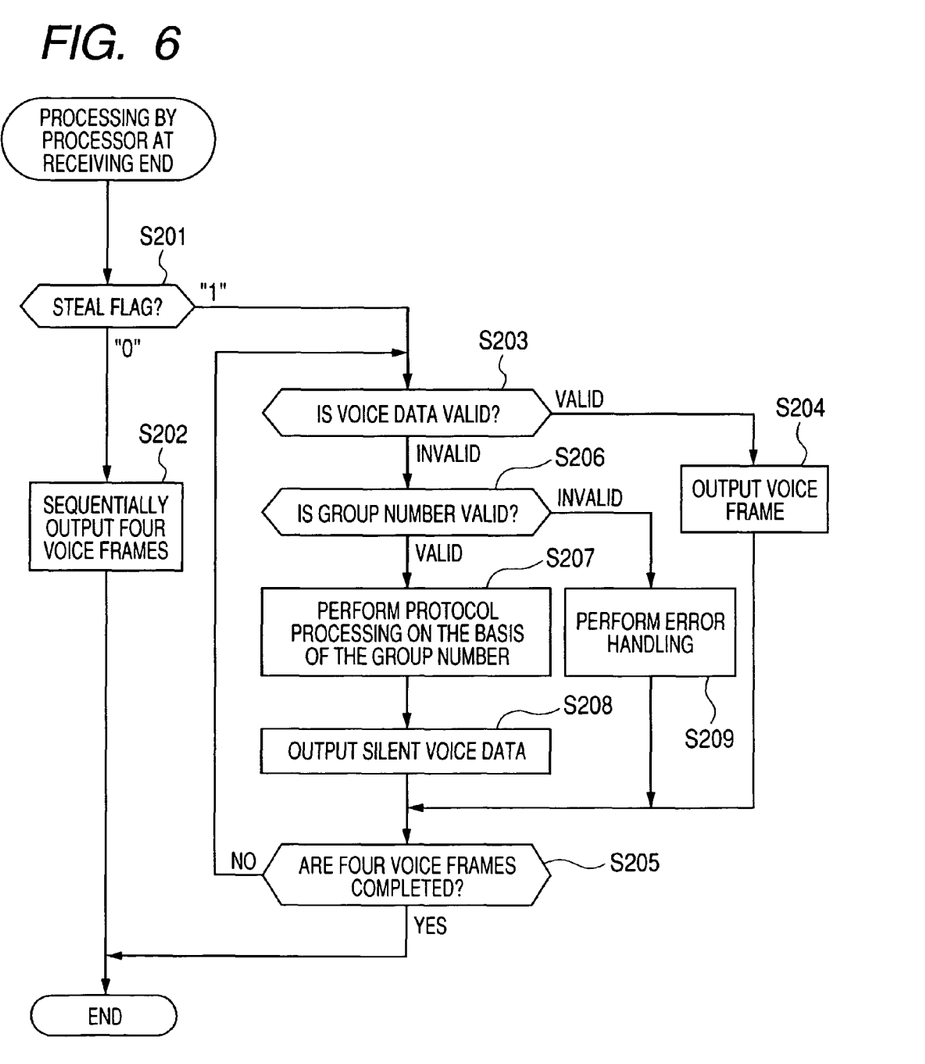
FIG. 6 is a flowchart illustrating software processing at a receiving end in the case of using a processor in a processing circuit.

In addition, a processor of the mobile telephone terminal 11 at the receiving end discriminates the steal flag SF in the decoded transmission frame, for example, as shown in a flowchart of FIG. 6 (step S201), and when the steal flag SF is "0", it outputs four voice frames in the transmission frame to the D/A converter 310 one by one (step S202).

Furthermore, when the steal flag SF is "1", it discriminates whether each voice frame in the transmission frame is valid as voice data (step S203), and when valid, it outputs the voice frame to the D/A converter 310 (step S204). Then, it discriminates whether the processing is completed for all the four voice frames in the transmission frame (step S205), and when completed, it finishes the processing about this transmission frame, but when voice frame whose processing is not completed remains, it returns to step S203 and it executes the processing about the following voice frame.

On the other hand, when it discriminates that the data of the voice frame is invalid as voice data, it judges whether it is valid as a group number (step S206). When it judges that it is valid as a group number, it executes protocol processing on the basis of the group number (step S207), and it outputs silent voice data to the D/A converter 310 (step S208). In addition, at step S206, when it discriminates that it is invalid also as a group number, it executes error handling or other processing (step S209).

Figure 7:
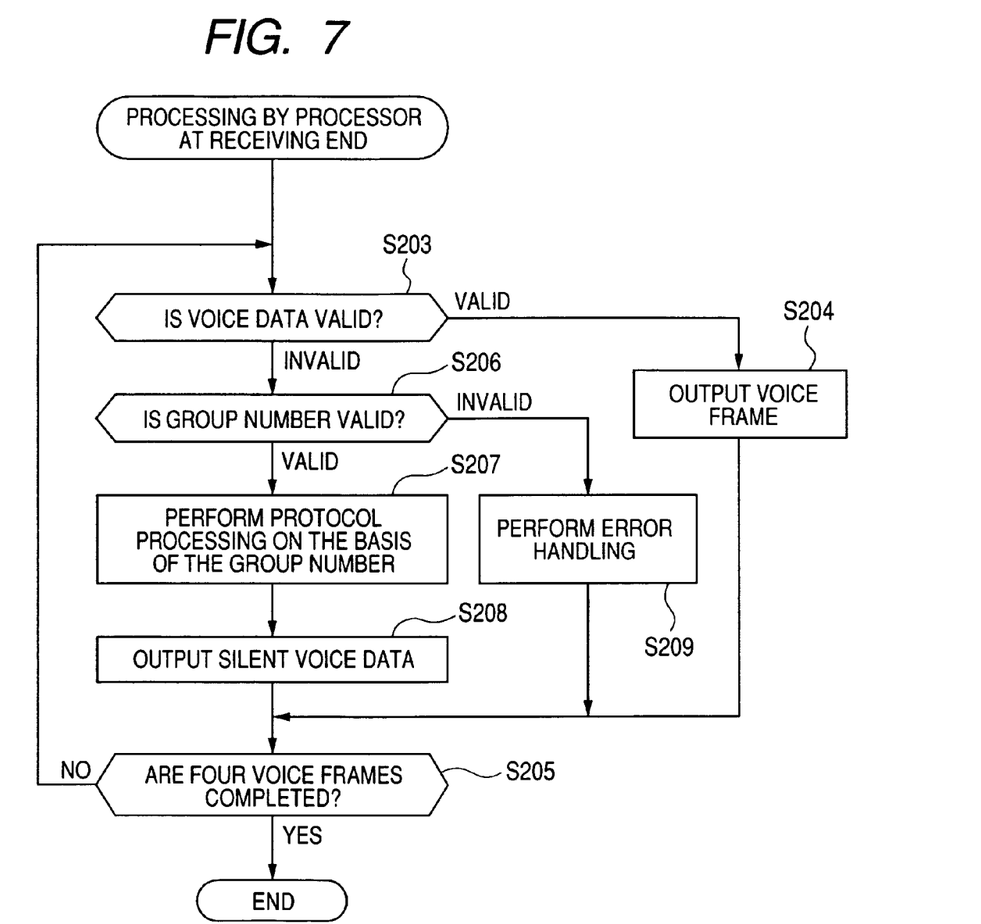
FIG. 7 is a flowchart for explaining another method of discriminating whether to be voice data or a group number.

In addition, in the above-described embodiment, although control is performed using turning-on and -off of the steal flag SF, without using this, as shown in FIG. 7, it is also sufficient to perform parallel processing of validity determination of voice data and validity determination of group number data, and to use the data which is valid. Furthermore, a content of processing at each step is the same as the content of processing at a corresponding step in FIG. 6.

In addition, although the group number is handled in the above-mentioned embodiment as data which steals voice and is transmitted, it is possible to use for transmission of not only the group number but also other arbitrary data which is desired to transmit it in a call.

In addition, in the above-mentioned embodiment, although the mobile telephone terminal 11 is illustrated as a communication terminal, it may also be a personal computer, a PDA terminal, a game machine, or the like.

INDUSTRIAL APPLICABILITY

It is possible to achieve a communications system which transmits voice signal in real time, and can transmit predetermined data other than voice efficiently without spoiling whole communication quality.

The invention claimed is:
1. A communication method that gives permission of participation to a receiving apparatus intending to participate in a group by performing follow-up participation in a group call communication being performed among a plurality of numbers belonging to a predetermined group, wherein
at a transmission end, the method comprising:
a step of encoding and framing an inputted voice signal to generate voice frames of voice data;
a step of discriminating which of sonant audio or silent audio the inputted voice signal is when starting a group call and of incorporating a group number needed for the group call communication into a voice frame which is discriminated to be silent audio;
a step of composing at least a predetermined number N of continuous voice frames and a flag of identifying whether all the N continuous voice frames are sonant audio or at least any one of the N continuous voice frames is not sonant audio, to form a transmission frame;
a step of wirelessly transmitting the transmission frame,
at a reception step performing the follow-up participation to a group, the method comprising:
a step of receiving the wirelessly transmitted signal to decode it to a transmission frame;
a step of decoding a voice frame in the decoded transmission frame;
a first judgment step of judging from the flag in the decoded transmission frame whether all the N voice frames are sonant audio or at least any one of the N voice frames is not sonant audio;
a step of outputting voice data in the decoded voice frame if all the N voice frames are judged to be sonant audio in the first judgment step;
a second judgment step of judging whether data in the decoded voice frame is valid or invalid as voice data if at least any one of the N voice frames is judged to be sonant audio in the first judgment step;

a third step of outputting the data in the decoded voice frame as voice data if it is judged to be valid as voice data in the second judgment step and of judging whether the data in the decoded voice frame is valid or invalid as a group number if it is judged to be invalid as voice data in the second judgment step;

a step of performing error handling if it is judged to be invalid as a group number in the third step;

a step of performing a protocol process based on the group number if it is judged to be valid as a group number;

a step of allowing a group call to be received, converting the voice data to a voice signal and canceling a mute to emit sound if the group number is judged to coincide with a group number of a group to which itself belongs, in the protocol process; and a step of not canceling the mute if the group number is judged not to coincide with a group of a group to which itself belongs, in the protocol process.

* * * * *